United States Patent [19]
Ohkubo et al.

[11] Patent Number: 5,738,352
[45] Date of Patent: Apr. 14, 1998

[54] GAME MACHINE CONTROLLER

[75] Inventors: Yuuichi Ohkubo; Takashi Yamaguchi, both of Shizuoka, Japan

[73] Assignee: Sugiyama Electron Co., Ltd., Japan

[21] Appl. No.: 780,969

[22] Filed: Jan. 9, 1997

Related U.S. Application Data

[62] Division of Ser. No. 401,551, Mar. 9, 1995, Pat. No. 5,624,117.

[30] Foreign Application Priority Data

Jul. 28, 1994 [JP] Japan ................ 196127/1994
Sep. 29, 1994 [JP] Japan ................ 259510/1994

[51] Int. Cl.[6] ........................................ A63F 9/22
[52] U.S. Cl. .................. 273/148 B; 463/37; 463/38; 463/46; 345/156
[58] Field of Search .................. 273/148 B; 463/36, 463/38, 1, 37, 46, 47; 345/156, 157, 161

[56] References Cited

U.S. PATENT DOCUMENTS

| | | | |
|---|---|---|---|
| 4,552,360 | 11/1985 | Bromley et al. | 463/38 |
| 5,207,426 | 5/1993 | Inoue et al. | 273/148 B |
| 5,379,663 | 1/1995 | Hara | 345/161 X |
| 5,451,053 | 9/1995 | Garrido | 463/37 X |
| 5,624,117 | 4/1997 | Ohkubo et al. | 463/37 X |

*Primary Examiner*—Raleigh W. Chiu
*Attorney, Agent, or Firm*—Ostrolenk, Faber, Gerb & Soffen, LLP

[57] ABSTRACT

A game machine controller with keys controls the movement of an image subject displayed on a monitor screen in an X- and a Y-axis direction. A first and a second controller section are coupled to each other by a coupling member. Relative displacement information of the first and second controller sections with respect to the coupling member is detected. The movement of the image subject in a Z-axis direction is controlled based on the detected displacement information.

10 Claims, 7 Drawing Sheets

GAME MACHINE CONTROLLER

This is a division of application Ser. No. 08/401,551, filed Mar. 9, 1995, now U.S. Pat. No. 5,624,117.

BACKGROUND OF THE INVENTION

The present invention relates to a game machine controller and, more particularly, to a game machine controller for controlling a particular image subject or a game situation displayed on a monitor screen.

Game machines, in which the movement of image displayed on household television set screen or on a large size business purpose screen, have been spread all over the world. In this type of game machines, a game cassette accommodating a recording medium (ROM), in which image data, voice data and operation program data concerning a pertinent game are stored, is loaded in a game machine body, while the game machine body includes a CPU for reading out information from the recording medium of the game cassette and generates image and voice signals concerning the game displayed on a monitor screen. For controlling the progress of game on this type of game machines, the user uses a controller and operates various buttons and keys provided thereon to send out control signal to the game machine.

The controller is used in this way to control the movement and state of the image displayed on the monitor screen. The user holds the controller with both hands and operates various buttons and keys provided on the controller body for the control noted above. The control of the image subject displayed on the screen by the controller is mainly movement of the image subject, and the control is made on two-dimensional movement in the X- and Y-axis directions.

As described above, the prior art game machine controller is for controlling two-dimensional (i.e., X- and Y-axis directions) movement of the image subject displayed on the monitor screen.

Meanwhile, the game contents in the game machines recently have been becoming richer in variety with the provision of various contrivances. If it is made possible to extend two-dimensional movement of the image subject as prescribed on the screen to three-dimensional one including the depth direction or other change control of the game situation, the game contents may be made further richer. Up to date, however, there has not been provided any game machine controller, which permits control of three-dimensional movement of the image subject on the monitor.

In another aspect, the status of the game contents displayed on the monitor screen is usually controlled by using various keys and buttons provided on the controller front. However, with increase of control functions the numbers of keys and buttons that have to be provided are increased. This leads to the problems that the keys and buttons do not only occupy the substantial part of the controller front but also deteriorate the properties of operation control.

Figure 7:
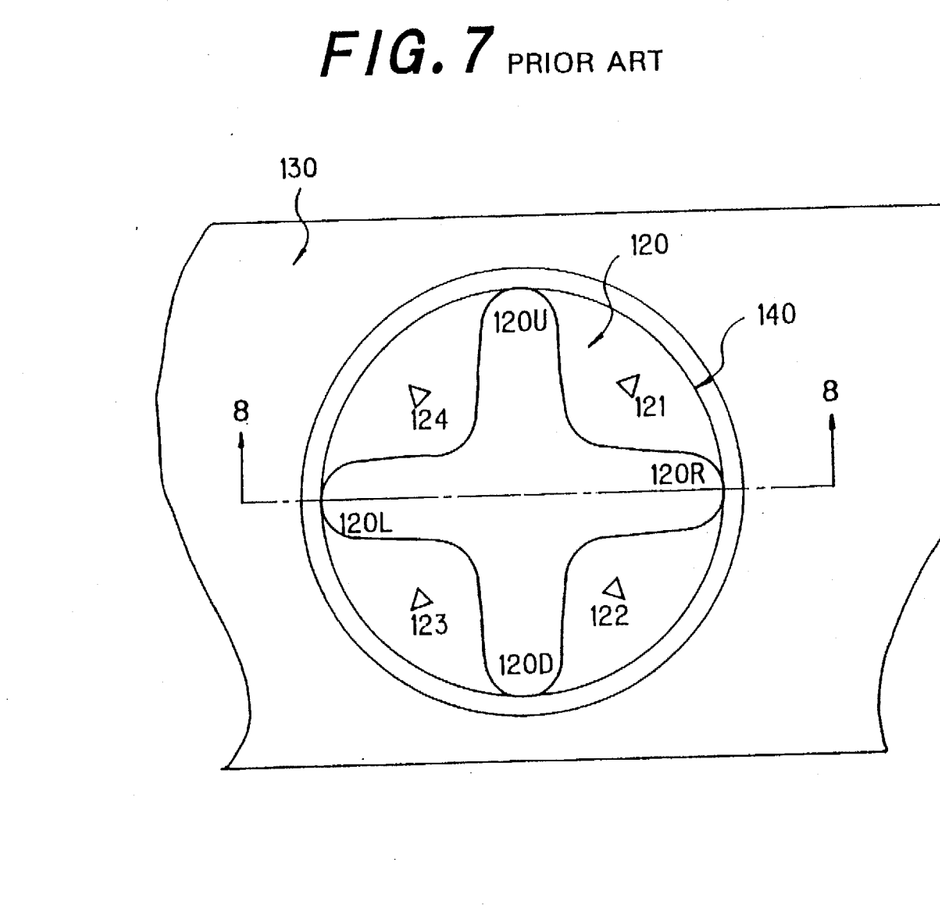
FIG. 7 is a plan view of a prior art game machine controller.
Figure 8:
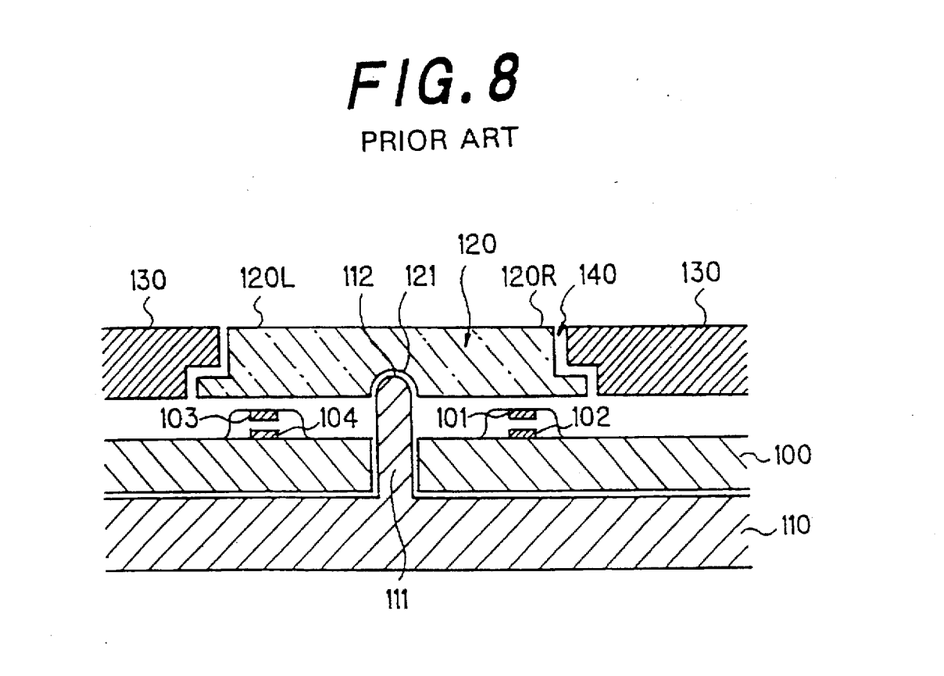
FIG. 8 is a fragmentary cross-section taken through line A—A in FIG. 7 looking in the direction of arrows A, A.

FIGS. 7 and 8 show a different example of prior art controller. As shown, it is a general structure that in an opening 140 of a controller body 130 a key member 120 is movably fitted and that in a recess 121 of a substantially semicircular sectional profile provided on a central portion of the rear surface of the key member 120 a top portion 112 of a projection 111 of a hard material such as plastics formed on a base mount 110 is inserted. The key member 120 has key sections 120U, 120D, 120R and 120L in a cross-shaped arrangement. It permits designation of the movement of the image subject in a desire direction with a corresponding operation of key section depression. For example, when the upward key section 120U is depressed, an upward designation is produced from the controller. Likewise, when the downward, rightward and leftward keys 120D, 120R and 120L are depressed, the controller produces designations of the downward, rightward and leftward movements respectively.

FIG. 8 is a sectional views taken along lines A—A in FIG. 7. In the opening 140 of the controller body 130 the key member 120 is disposed, which has a recess 121 and is supported by the neighborhood of the top of the projection 111 of the base mount 110. By depressing the rightward key 120R in the right side of key member 120, contacts 101 and 102 are made, which are supported by an elastic material provided on a printed circuit board 100 and normally held spaced apart by a predetermined distance. In this way, the depression of the rightward key 120R is detected, and a control signal is produced through a circuit structure formed in the printed circuit board 100 to the outside. Likewise, by depressing the leftward key 120L, contacts 103 and 104 of like structure with contacts 101 and 102 are made, whereby a leftward designation signal is produced. Similarly, with the upward and downward keys 120U and 120D, respective direction designation signals are provided upon detection of making of contacts (not shown) as a result of depression of the respective key sections provided on the printed circuit board 100.

Further, it is possible to provide not only the above upward, downward, leftward and rightward designations but also directional designations of mid angle (oblique) directions between adjacent ones of the above directions. To this end, mid angle direction key sections 121 to 124 are provided for designating the mid angle directions between those of the keys 120U and 120R, the keys 120R and 120D, the keys 120D and 120L and the keys 120L and 120U as shown in FIG. 7. The detection of the depression of these key sections is made through detection of simultaneous making of the contacts corresponding to adjacent two of the upward, downward, leftward and rightward key sections. For example, by depressing the key section 121 the upward and rightward keys 120U and 120R are depressed, thus causing the making (closing) of two corresponding pairs of contacts. It is thus possible to detect designation of a mid angle direction from the making of the two sets of contacts.

As described, the prior art Game machine controller has a structure that the key member 120 is movably fitted in the opening 140 of the controller body 130 and that in the recess 121 of the substantially semicircular sectional profile provided on the central portion of the rear surface of the key number 120 the top portion of the projection 111 of the hard material such as plastics of the base mount 110 is inserted, and is thus posing various problems.

For example, in the prior art controller the whole key member 120 is supported such that the top portion 112 of the projection 111 of the base mount 110 is engaged in the recess 121 of substantially the semicircular sectional profile formed in a central portion of the rear surface of the key member 120, and predetermined peripheral portions of the key member 120 are depressed for movement thereof about the top portion 112 for producing directional designation signal. This means that key depression forces are applicable to the sole top portion 112 in various directions. Further, if shape deformation of the top portion 112 of the projection 111 occurs during the stage of formation or long use, it is liable that depression of the central portion of the key member 120 results in contacting or closing of all the contacts provided under the key sections 120U, 120R, 120D and 120L and that correct directional designation is no longer possible.

Another serious problem is posed in that while either of the key sections 121 to 124 is depressed for producing a mid angle direction designation, the designation of mid angle direction is detected through detection of the simultaneous making of two adjacent sets of contacts. This means that in many cases only a single set of contacts is made unless an appropriate portion of any mid angle direction key section is strongly depressed. In such cases, there causes the further problem, it is necessary to change the position of the depression or depress the portion with a stronger force, making it possible to prompt operation of the game controller.

SUMMARY OF THE INVENTION

An object of the present invention, therefore, is to provide a game machine controller capable of expanding the movement of image subject displayed on the monitor screen to three-dimensional one or controlling other game situation with a comparatively simple structure.

Another object of the present invention is to provide a game machine controller, which has a function of controlling the status of game contents displayed on the monitor screen with a comparatively simple structure other than keys and buttons.

A further object of the present invention is to provide a game machine controller capable of various directional designations, as well as being highly durable.

According to one aspect of the present invention, there is provide a game machine controller with keys for controlling the movement of an image subject displayed on a monitor screen in an X- and a Y-axis direction, comprising: a first and a second controller section coupled to each other by a coupling member, relative displacement information of the first and second controller sections with respect to the coupling member being detected, the movement of the image subject in a Z-axis direction being controlled based on the displacement information.

According to another aspect of the present invention, there is provide a game machine controller for controlling the situation of game contents displayed on a monitor screen in response to a control signal, comprising: first and second controller sections coupled to each other by a coupling member, relative displacement information of the first and second controller sections with respect to the coupling member being detected, the control signal being provided based on the detected displacement information.

According to other aspect of the present invention, there is provide a game machine controller with a key section having an X- and a Y-axis keys for controlling the movement of an image subject displayed on a monitor screen in an X- and a Y-axis directions, comprising: a pillar-shaped Z-axis key section movable in directions substantially perpendicular to the surface of the key section, and a movement detector for detecting the direction and extent of movement of the Z-axis key section in the perpendicular direction.

According to still other aspect of the present invention, there is provide a game machine controller with a base mount provided with a key section for designating an X- and a Y-axis directions and a predetermined angle direction with respect to the X- and Y-axis directions on a monitor screen as an oblique direction of an image subject displayed on the monitor screen, comprising: a pillar-shaped Z-axis key section movable in directions substantially perpendicular to the surface of the key section, and a movement detector for detecting the direction and extent of movement of the key section in the perpendicular direction.

According to further aspect of the present invention, there is provide a game machine controller with keys for controlling the movement of an image subject displayed on a monitor screen in an X- and a Y-axis direction, comprising: a first and a second controller section coupled to each other by a coupling member, relative displacement information of the first and second controller sections with respect to the coupling member being detected, the situation of the game contents being controlled based on the displacement information, the key section is a plate-shaped member provided on at least either of the first and second controller sections such that the X- and Y-axis directions are designated by depressing end portions of a cross key provided on top of the plate-shaped member and that a mid angle direction is designated by designating a predetermined portion of the plate-shaped member between an X- and a Y-axis direction key sections, diametrically opposed portions of the outer circumference of the key section are freely rotatable mounted via respective first shafts in respective diametrically opposed portions of the inner circumference of the outer ring, and diametrically opposed portions of the outer circumference of the outer ring at a predetermined angle with respect to the positions of mounting of the first shafts are mounted freely rotatably via the second shafts held in shaft retainers secured to the base mount.

Other objects and features will be clarified from the following description with reference to attached drawings.

DETAILED DESCRIPTION OF THE EMBODIMENT

Figure 1:
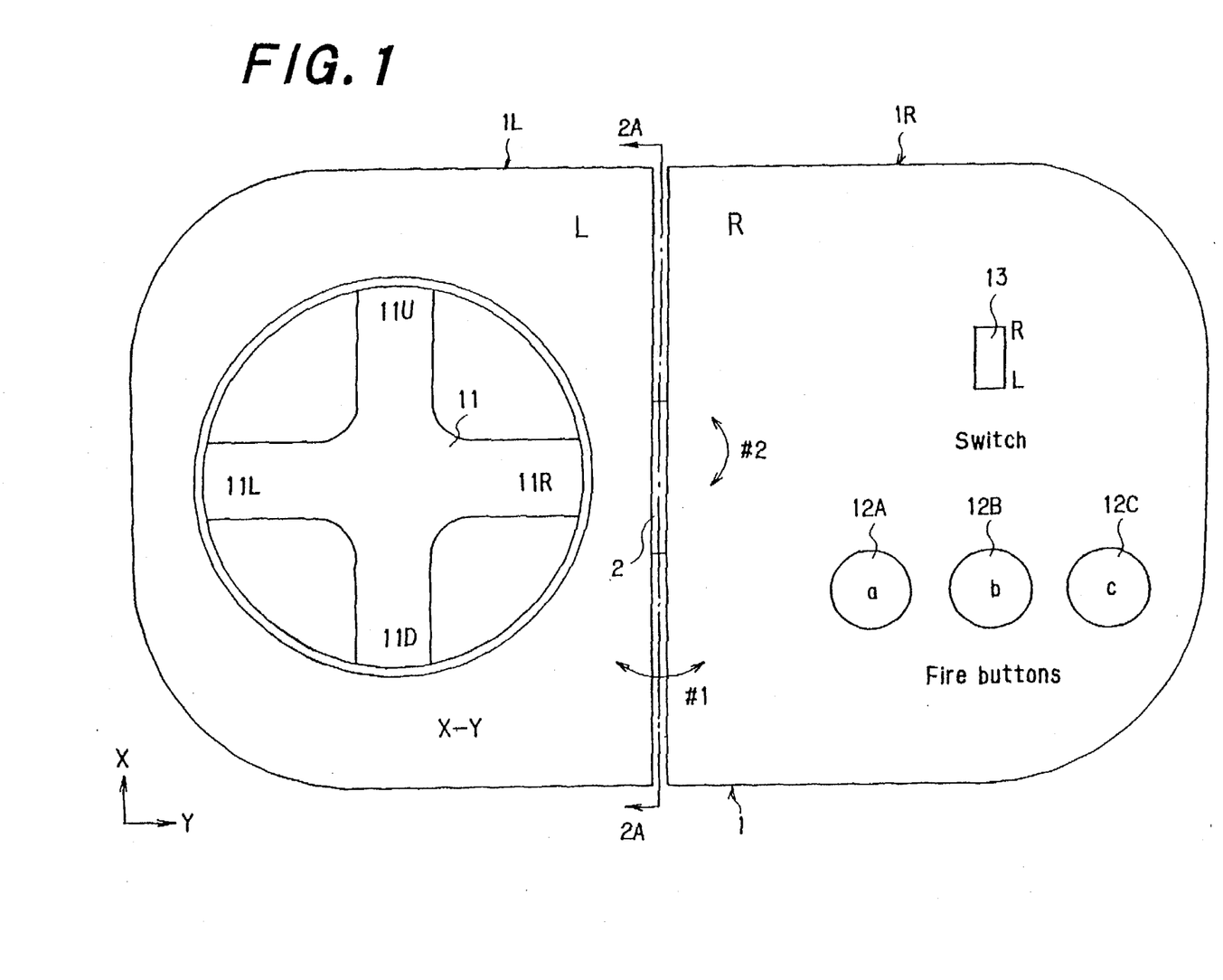
FIG. 1 is a plan view showing an embodiment of the game machine controller according to the present invention.

Now, the embodiment of the present invention will be described. FIG. 1 is a plan view showing an embodiment of the game machine controller according to the present invention. A controller body 1 in this embodiment comprises a left and a right controller sections 1L and 1R, which are provided as separate members and coupled together by a coupling shaft 2.

The left controller section 1L includes a key member 11 for causing movement of the image subject on the monitor screen in X- and Y-axis directions. The key member 11 is a cross-shaped key. For causing rightward movement of the image subject, its key section 11R is depressed. For leftward movement, its key section 11L is depressed. Upward and downward movements of the image subject are controlled by depressing respective key sections 11U and 11D.

The right controller section 1R has fire buttons 12A, 12B and 12C for designating special functions such as a continuous shooting function, and a polarity switch 13 to be described later. The left and right controller sections 1L and 1R are coupled together for their relative rotation by the coupling shaft 2. With this rotation, the movement of the image subject in the Z-axis direction (i.e., in the depth direction of the screen) or other game control designation is controlled. More specifically, it is possible to specify the extent of movement in the Z-axis direction according to the angle of the relative rotation of the left and right controller sections 1L and 1R, or it is possible that when the rotation is caused by a certain angle the image subject be moved dispersedly by a predetermined distance.

Figure 2:
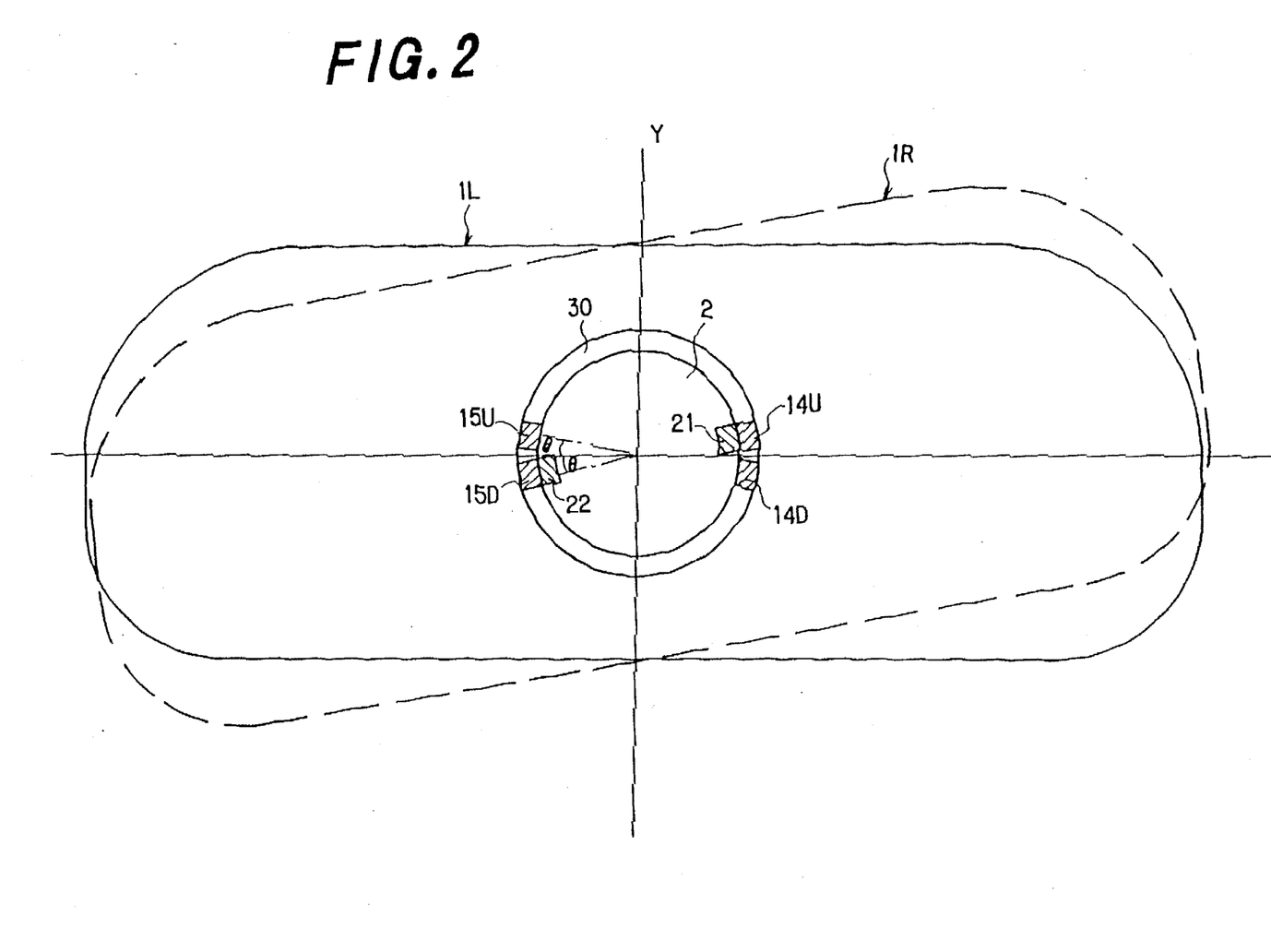
FIG. 2 is a schematic sectional view taken along line 2A—2A in FIG. 1.

FIG. 2 is a schematic sectional view taken along line 2A—2A in FIG. 1. In this example, the image subject on the monitor screen is controlled to be moved in the Z-axis direction when the left and right controller sections 1L and 1R are rotated relatively by a predetermined angle.

Referring back to FIG. 1, at least either one of opposed portions of the left and right controller sections 1L and 1R is formed with an opening port 30, through which the coupling shaft 2 is inserted to couple together the two controller sections.

In this embodiment, the left controller section 1L is formed with the opening port 30, through which one end portion of the coupling shaft 2 is inserted for rotation, the other end portion of the coupling shaft 2 being secured to the right controller section 1R. Referring to FIG. 2, the X-axis line is a horizontal line extending through the opening port 30 in the left controller section 1L and the center of the coupling shaft 2. The Y-axis line passes through the center noted above and perpendicular to the X-axis line. Conductive electrodes 15U and 15D are provided on the surface of the opening port 30 at positions making an angle θ in the +Y and −Y directions with respect to the X-axis line. Like electrodes 14U and 14D are provided at a position symmetric to the electrodes 15U and 15D with respect to the Y-axis. The outer circumferential surface of the coupling shaft 2 secured to the right controller section 1R, facing the surface of the opening port 30, is formed with a conductive electrode 21, which is located on the X-axis line when the left and right controller sections 1L and 1R are in a horizontal relation to each other, and another electrode 22 in a symmetrical position to the electrode 21 with respect to the Y-axis.

The user may hold the left and right controller sections 1L and 1R shown in FIG. 1 with the left and right hands, respectively, for operating various buttons and switches with fingers, while rotating the right controller section 1R counterclockwise by θ with respect to the coupling shaft 2, thus causing rotation of the coupling shaft 2 secured to the right controller section 1R by θ. As a result, the electrodes 22 and 21 formed on the coupling shaft 2 are brought into contact with the electrodes 15D and 14D formed on the surface of the opening port 30 in the left controller section 1L. This state of contact is detected electrically for control such that the image subject on the monitor screen is moved a predetermined distance in the Z-axis direction or a specific control designation other than the X-axis and Y-axis directions.

The above description is such that the coupling shaft 2 is secured to the right controller section 1R, but it is possible as well to secure the coupling shaft to the left controller section 1L and provide similar electrodes on the surface of the opening port which is provided in the right controller section 1R.

While the structure as shown in FIG. 2 permits movement in the Z-axis direction, it is possible to provide the rotary portion of the coupling shaft 2 with a rotation angle detector such as a rotary encoder and permit movement in the Z-axis direction according to the detected angle of the rotation. It is also possible to use the well-known optical or magnetic means as the rotation angle detector. Further, it is possible to detect the angle made by either one of the left and right controller sections with respect to the plane formed by the two sections and control the Z-axis direction movement of the image subject according to the detected angle.

Not only the control of the Z-axis direction movement is obtainable with the rotation of the left and right control sections 1L and 1R about the center of the coupling shaft 2, but also it is possible to provide for control of the two controller sections for different modes of relative movement. For example, where the two controller sections are coupled together by a coupling member, Z-axis movement control is obtainable by detecting other relative movement of the two controllers than such rotation, i.e., rotation in directions #1 and rotation in directions #2.

In the above embodiment, the left or right controller section 1L or 1R is rotated or moved for Z-axis direction movement control and the others. The operation of the rotation or movement is usually made by the user's dominant hand. This means that the Z-axis movement is set in either direction depending on the dominant hand. That is, the right hander causes Z-axis direction movement by turning the right controller section 1R, while the left hander turns the left controller section 1L to the same end. This means that the left hander causes Z-axis direction movement in the opposite direction to that of movement caused by the right hander.

In other embodiment, the front of the controller body 1 is provided with a switch 13 for compensating electrically the above polarity change depending on whether the user is a right or a left hander. More specifically, the switch 13 shown in FIG. 1 which has a slide switch structure, is set to its R side for the right hander and to its L side for the left hander. With this arrangement, the above inverse rotation of the direction of the Z-axis direction movement depending on the dominant hand can be avoided, and thus right Z-axis direction movement control is obtainable at all times.

Further, it is possible to permit control of the situation of game contents displayed on the monitor screen according to relative displacement information of the first and second controller sections with respect to the coupling member in the above description (for instance control a continuous shooting function according to status of displacement). This means that control is possible with other means than keys and buttons provided on controller front as in the prior art. Thus, it is possible to greatly improve the operation control property.

As has been described in the foregoing, in the game machine controller according to the above embodiment the two controller sections constituting the controller body are coupled together by the coupling member, and the image subject on the monitor screen is moved in the Z-axis direction according to the relative movement of the two controller sections. It is thus possible to obtain three-dimensional movement control and permit further enrichment of game contents to be obtained with a simple structure.

Figure 3:
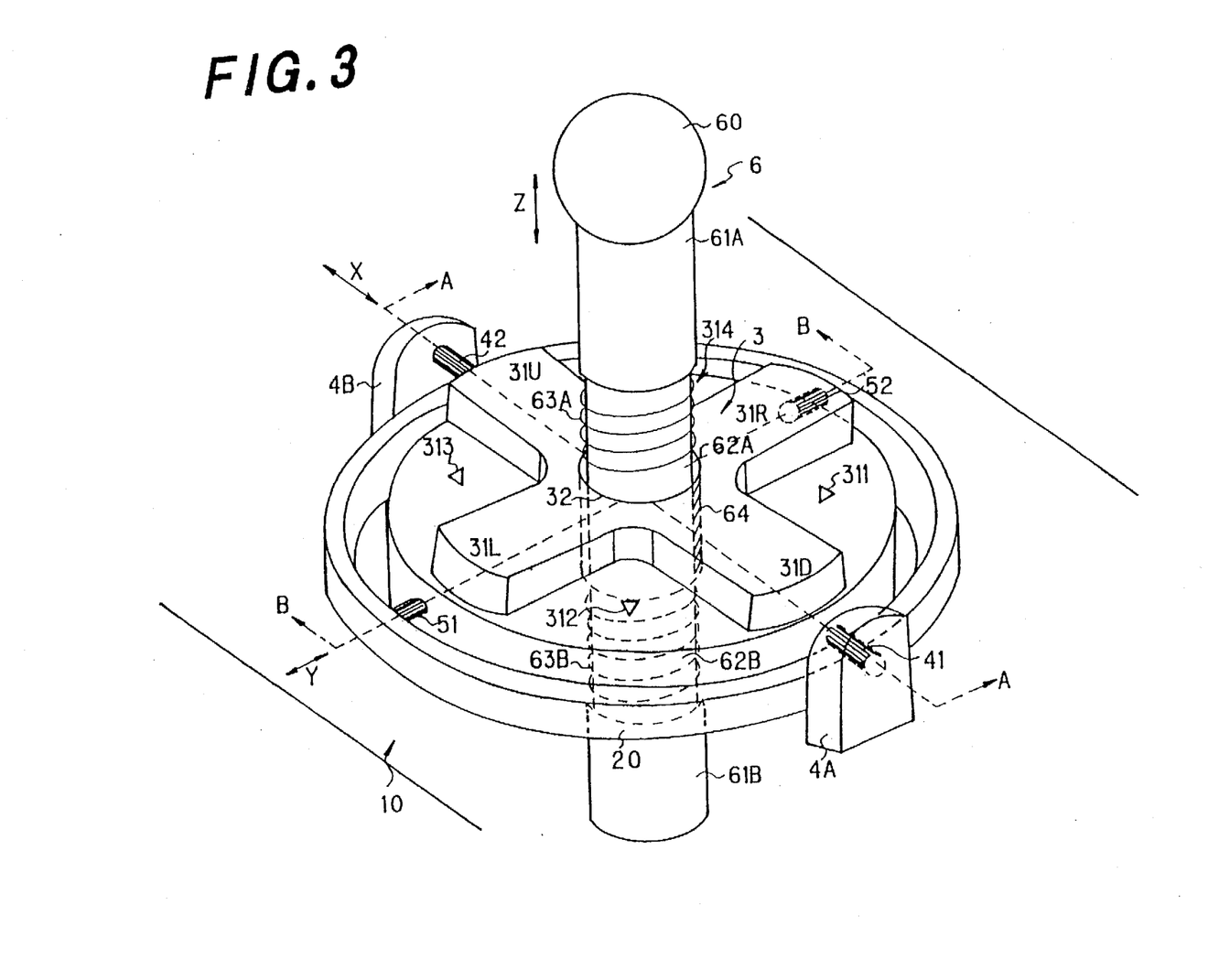
FIG. 3 is a perspective view showing a different embodiment of a pair of the game machine controller according to the present invention.

FIG. 3 is a perspective view showing a different embodiment of a pair of the game machine controller sections according to the present invention. This embodiment is a high durability game machine controller, which permits various directional designations to be done accurately and quickly.

On a base mount 10, shaft retainers 4A and 4B are provided at a predetermined distance from each other. Shafts 41 and 42 are provided in bearings (not shown) of the shaft retainers 4A and 4B. For instance, the shafts 41 and 42 have their ends opposite the bearings secured to diametrically opposite portions of the outer circumference of a circular outer ring 20. The outer ring 20 constitutes a first movable stage that is freely rotatable or pivotable relative to base 10 via an axis defined by the bearings of the shaft retainers 4A and 4B. The outer ring 20 may be integral with the shafts 41 and 42. In the inner opening of the outer ring 20, a key member 3 is disposed which is, for instance, disk-like with a slightly smaller outer diameter than the inner diameter of the outer ring 20. The inner circumference of the outer ring 20 is provided at positions orthogonally related to the shafts 41 and 42 with bearings (not shown), in which shafts 51 and 52 are supported for free rotation. The key member 3 constitutes a second movable stage that is freely rotatable or pivotable relative to first stage 20 about an axis established defined by the shafts 51 and 52 that are normal to the shafts 41 and 42.

As shown in FIG. 3, the key member 3 has an upward and a downward key section 31U and 31D extending in the direction of the shafts 41 and 42 (X-axis direction). By depressing either of these key sections, the key member 3 is rotated about the shafts 51 and 52 (Y-axis). The key member 3 further has a leftward and a rightward key section 31L and 31R extending in the direction of the shafts 51 and 52 (Y-axis direction). By depressing either of these key sections, the key member 3 is rotated about the X-axis. Further, the key member 3 has four mid angle direction key sections 311 to 314 (key 314 being not shown) provided between adjacent ones of the upward, downward, leftward and rightward key sections 31U, 31D, 31L and 31R. By depressing each mid angle direction key section, both the shafts 41 and 42 and the shafts 51 and 52 are rotated, and in this way a mid (45 degree) angle direction between adjacent ones of the upward, downward, leftward and rightward key sections is designated. In this case, the rotation of the key member 3 is regulated by both the shafts 41 and 42 and the shafts 51 and 52. That is, the key member 3 is rotated to a constant tilting by depressing any portion of the mid angle direction key section, and the contacts of the pertinent adjacent ones of the upward, downward, leftward and rightward key.

The key member 3 has a central hole 32 penetrating it in its thickness direction. A Z-axis key section 6 for designating the extent of movement in the Z-axis direction is inserted through the hole 32. The Z-axis key section 6 has thick portions 61A and 61B and thin portions 62A and 62B projecting toward its both ends. It further has a movement detection portion 64 provided on its inserted portion for detecting its Z-axis direction movement and extent thereof. A coil spring 63A is provided on a stepped difference portion between the portions 61A and 62A and the step difference formed on the side opposite the hole 32 of the key member 3 for providing an upward movement force with repulsive force against the downward force in the Z-axis direction. Likewise, a coil spring 63B is provided on a stepped difference portion between the portions 61B and 62B and the step difference formed on the side opposite the hole 32 of the key member 3 for providing a downward movement force with repulsive force against the upward force in the Z-axis direction. Thus, in the normal state without any external force applied to the Z-axis key section 6, the Z-axis key section 6 is at a fixed position, at which the repulsive spring forces of the coil springs 63A and 63B are in equilibrium. The Z-axis key section 6 has a top 60, which is a sphericity to be held by the operator and provides for operation control property improvement.

Figure 4A:
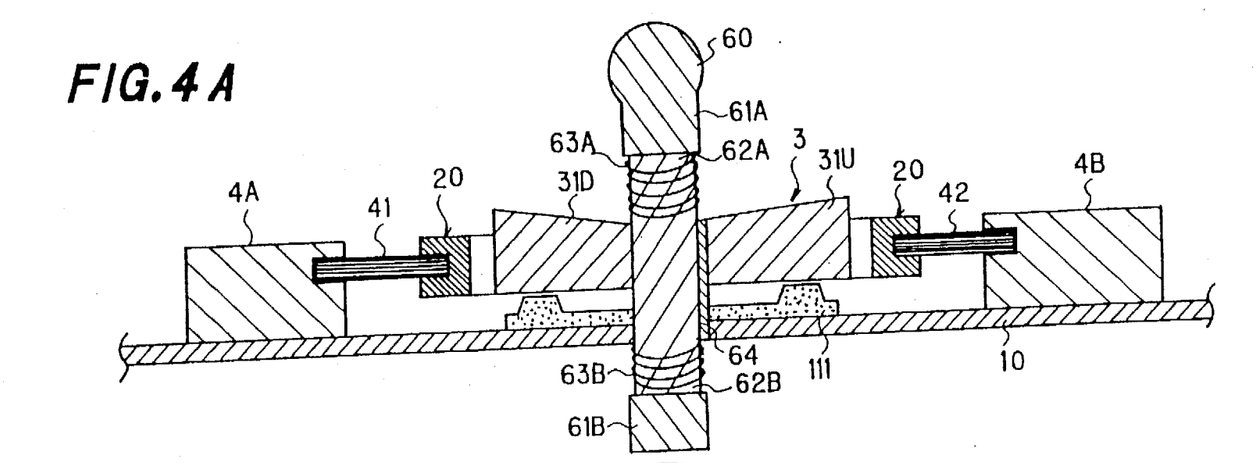
FIGS. 4A and 4B are sectional views taken along lines A—A and B—B in FIG. 3.
Figure 4B:
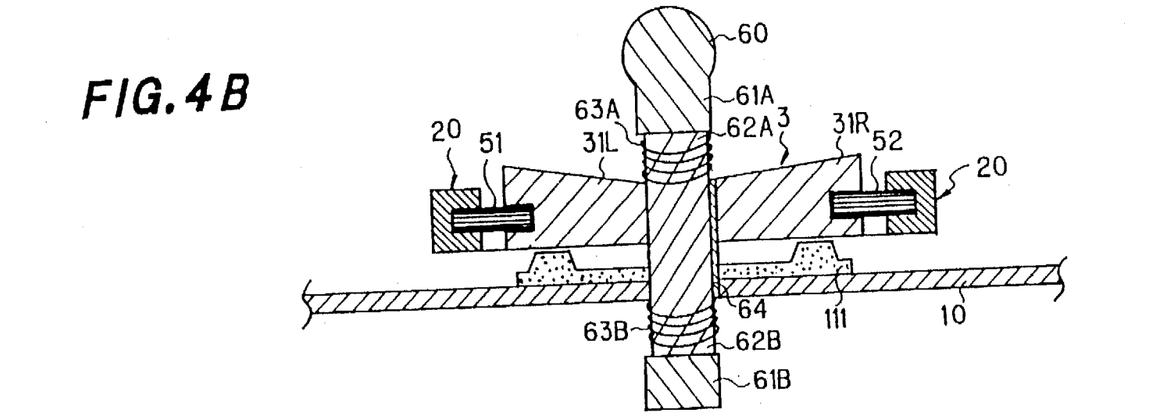

FIGS. 4A and 4B are sectional views taken along lines A—A and B—B in FIG. 3, respectively. As is seen from FIG. 3, the tops of the upward, downward, leftward and rightward direction key sections 31U, 31D, 31L and 31R are projected above the top of the mid angle direction key sections 311 to 314 (key section 314 being not shown), thus facilitating the discrimination of the two kinds of key sections by touch with hand and also providing for improvement of the operation control property.

Referring to FIG. 4A, the outer ring 20 can be rotated about the shafts 41 and 42 which are supported for rotation in the bearings of the shaft retainers 4A and 4B secured to the base mount 10. Also, referring to FIG. 4B, with respect to the direction of line B—B which is normal to the direction of line A—A, the key member 3 is freely rotatable about the shafts 51 and 52 supported for rotation in the bearings of the outer ring 20. Under the portions of the upward, downward, leftward and rightward direction key sections 31U, 31D, 31L and 31R that are to be depressed by the user (i.e., usually portions in the outer circumferential edge of the key member 3), a detector 111 is provided, which has contact pair (not shown) for detecting the key depression. When the key is depressed, the contact pair is made. It is possible to detect the key depression with other means as well, for instance appropriate circuit, element, etc. capable of the key depression.

Thus, when designating the upward, downward, leftward or rightward direction, a control signal concerning the designated direction is produced by depressing the corresponding key section. Further, when any of the mid angle direction key sections 311 to 314 is depressed, the controller provides a designation of the mid angle direction between pertinent adjacent ones of the upward, downward, leftward and rightward key sections by causing a movement with a maximum descend extent thereof set with respect to a direction (45 degree direction) defined under rotational restriction by the shafts 41, 42 and 51, 52 in the orthogonal position relation to one another. For example, when the mid angle direction key section 311 is depressed, the descend of the key member 3 is caused to a maximum extent in a direction at the mid angle (45 degrees) between the rightward and downward key sections 31R and 31D, thus causing reliable making of the contact pairs provided underneath the rightward and downward key sections 31R and 31D. Further, by depressing down or pulling up the Z-axis key section 6, the direction and extent of Z-axis direction movement are detected by the movement detector 64.

It is possible as well that the movement detector 64 detects electric contact of a conductor, which is provided on the inserted portion of the z-axis key section 6 inserted through the hole 32, and one or more conductor pieces which are provided at a predetermined intervals on the circumferential wall of the hole 32 of the key member 3. As a further alternative, it is possible to arrange such that the conductor can slide along an axially extending resistor formed on the circumferential wall of the hole 32 of the key member 3 for the movement detection according to a resistance change under the variable resistance principle.

Figure 5:
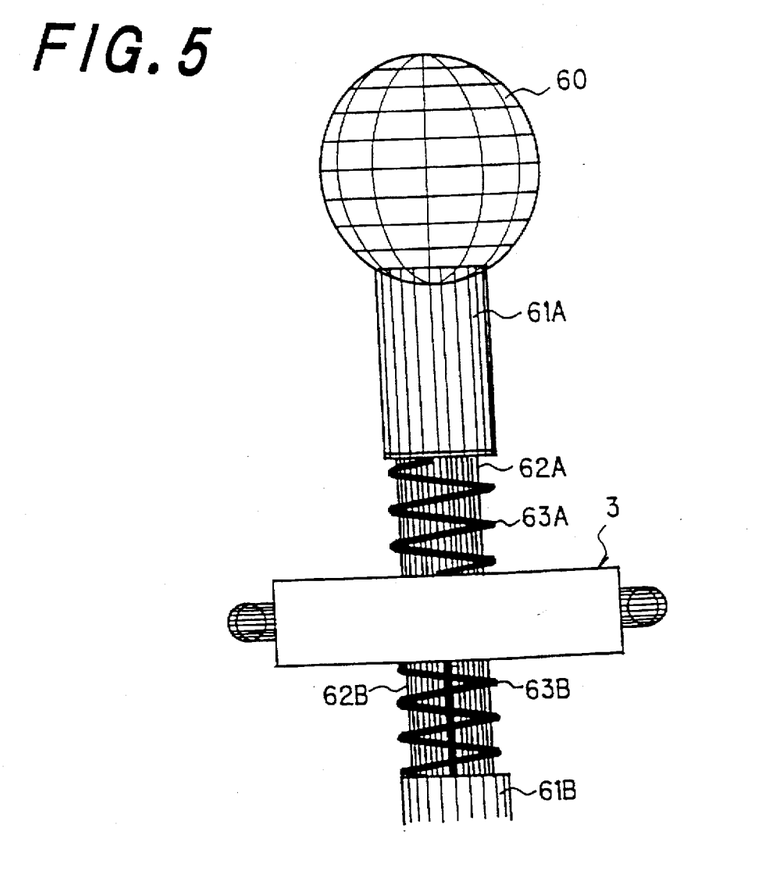
FIG. 5 is a side view showing the structure of an essential part in the neighborhood of the Z-axis key section 6 in the above embodiment.

FIG. 5 is a side view showing the structure of an essential part in the neighborhood of the Z-axis key section 6 in the above embodiment. In this embodiment, as noted above, the thin portions 62A and 62B of the Z-axis key section 6 are inserted through a substantially central portion of the key member 3 and are normally held at a neutral position by the coil springs 63A and 63B.

Figure 6:
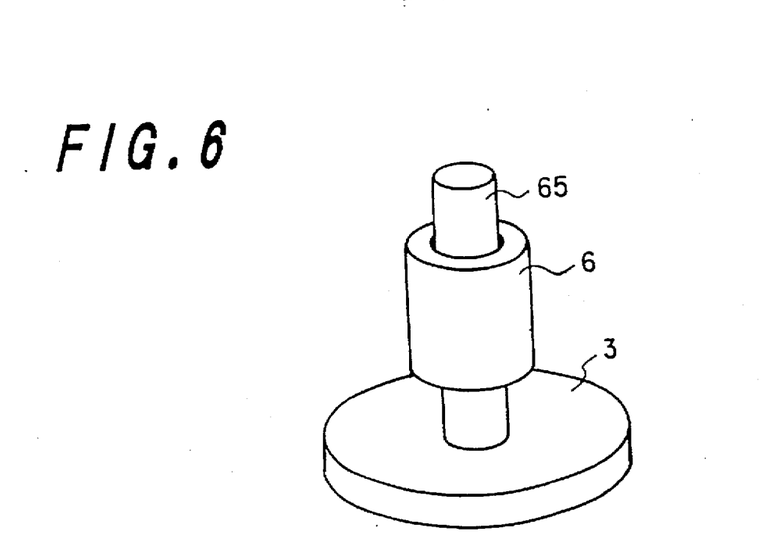
FIG. 6 is a side view showing the essential part of a different structure of Z-axis key section 6.

FIG. 6 is a side view showing the essential part of a different structure of Z-axis key section 6. In contrast to the above embodiment which is of axially slidable type, this embodiment is axially fixed type. More specifically, a shaft 65 is secured to substantially the center of the key member 3, and the direction and extent of movement of Z-axis key section 6 which is fitted on the shaft 65, are detected with the axial movement of the section 6 as the Z-axis direction movement by movement detector 64 provided on the outer circumferential portion as noted above.

In the above embodiments, the outer ring 20 and key member 3 are freely rotated about the orthogonally disposed shafts 41, 42 and 51, 52. However, the angle relation of the shafts may not only be the orthogonal relation, but may also be set to any other relation as desired. In this case, it is possible to permit producing outputting a designation of a direction corresponding to a predetermined angle. Further, it is possible to form the shafts 41 and 42 to be integral with the shaft retainers 4A and 4B and form bearings in the outer ring 20. As a further alternative, it is possible to form the shafts 51 and 52 to be integral with the outer ring 20 and form the bearings on the key member 3. In general, it is possible to form shafts to be integral with either one of the two support members for reducing the cost of manufacture.

As has been described in the foregoing, the game machine controller according to the embodiments of the present invention permits designation of movement not only in the X- and Y-axis directions but also in the Z-axis direction, that is, permits three-dimensional movement control. It is thus possible not only to permit further game content enrichment with a simple structure, but also to permit various directional designations to be done accurately and speedily. Further, pronounced effects compared with the prior art are obtainable in the durability respect.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. A game machine controller comprising:

a key section having an X-axis key and a Y-axis key for controlling the movement of an image subject displayed on a monitor screen in respective X-axis and Y-axis directions;

a pillar-shaped Z-axis key section movable in directions substantially perpendicular to a surface of the key section which contains the X-axis and the Y-axis keys; and a movement detector for detecting the direction and extent of movement of the Z-axis key section in the perpendicular direction.

2. The game machine controller according to claim 1, wherein the Z-axis key section is inserted in a central hole formed in the key section.

3. The game machine controller according to claim 1, wherein the Z-axis key section is a cylindrical member inserted through the outer circumference of a pillar-shaped member secured to a central portion of the key section.

4. The game machine controller according to claim 1, wherein the movement of the image subject to be displayed on a monitor is controlled based on detected designation information derived from said movement detector.

5. A game machine controller comprising:

a base mount provided with a key section for designating an X-axis direction, a Y-axis direction, and a predetermined angle direction with respect to the X-axis and Y-axis directions on a monitor screen as an oblique direction of an image subject displayed on the monitor screen;

a pilar-shaped Z-axis key section movable in Z-axis directions substantially perpendicular to a surface of the key section; and a movement detector for detecting the direction and extent of movement of the key section in the Z-axis directions.

6. A game machine controller comprising:

keys for controlling the movement of an image subject displayed on a monitor screen in an X-axis direction and a Y-axis direction;

a first and second controller section coupled to each other by a coupling member, with relative displacement information of the first and second controller sections with respect to the coupling member being detected, and situation of the game contents being controlled based o the displacement information;

a base mount supporting said first and second controller sections;.

a plate-shaped member constituting a key section provided on at least either of the first and second controller sections such that the X-axis direction and Y-axis direction are designated by depressing end portions of a cross key provided on top of the plate-shaped member and that a mid angle direction is designated by designating a predetermined portion of the plate-shaped member between said X-axis direction and Y-axis direction key sections;

diametrically opposed portions of the outer circumference of the key section being freely rotatable mounted via respective first shafts in respective diametrically opposed portions of the inner circumference of an outer ring; and diametrically opposed portions of the outer circumference of the outer ring being at a predetermined angle with respect to the positions of mounting of the first shafts that are mounted freely rotatably via the second shafts which are held in shaft retainers secured to the base mount.

7. The game machine controller according to claim 6, wherein the situation of the game contents is the movement of the image subject in a Z-axis direction.

8. The game machine controller according to claim 6, wherein the predetermined angle is 45 degrees.

9. The game machine controller according to claim 6, wherein the pair of first shafts are integral with the outer ring.

10. The game machine controller according to claim 6, wherein the pair of second shafts are integral with the outer ring or with the shaft retainers.

* * * * *